United States Patent
Chang et al.

(10) Patent No.: US 9,843,252 B1
(45) Date of Patent: Dec. 12, 2017

(54) MULTI-PHASE POWER CONTROLLER, MULTI-PHASE POWER CONTROL DEVICE AND OPERATION METHOD OF MULTI-PHASE POWER CONTROLLER

(71) Applicant: uPI Semiconductor Corp., Hsinchu County (TW)

(72) Inventors: Chih-Lien Chang, Hsinchu County (TW); Cheng-Ching Hsu, Hsinchu County (TW)

(73) Assignee: uPI Semiconductor Corp., Hsinchu County (TW)

( * ) Notice: Subject to any disclaimer, the term of this patent is extended or adjusted under 35 U.S.C. 154(b) by 0 days.

(21) Appl. No.: 15/438,778

(22) Filed: Feb. 22, 2017

(30) Foreign Application Priority Data

Sep. 14, 2016 (TW) .............................. 105129899 A

(51) Int. Cl.
- *H02M 3/158* (2006.01)
- *H02M 1/084* (2006.01)
- *H02M 1/00* (2006.01)

(52) U.S. Cl.
CPC .... *H02M 1/084* (2013.01); *H02M 2001/0003* (2013.01)

(58) Field of Classification Search
CPC ........ H02M 1/088; H02M 1/36; H02M 1/156; H02M 3/158; H02M 3/1584; H02M 3/15863
USPC .......................... 323/272, 282, 350, 351, 901
See application file for complete search history.

(56) References Cited

U.S. PATENT DOCUMENTS

| | | | |
|---|---|---|---|
| 7,061,215 B2 | 6/2006 | Harris | |
| 7,315,190 B1 | 1/2008 | Chen | |
| 7,342,383 B1 * | 3/2008 | Song | H02M 3/1584 323/222 |
| 7,469,353 B2 | 12/2008 | Mundada et al. | |
| 8,344,777 B2 | 1/2013 | Qiu et al. | |
| 2009/0256537 A1 * | 10/2009 | Sato | H02M 3/1584 323/272 |

(Continued)

FOREIGN PATENT DOCUMENTS

| | | |
|---|---|---|
| CN | 103676815 | 3/2014 |
| TW | I415374 | 11/2013 |
| TW | I474617 | 2/2015 |

OTHER PUBLICATIONS

"Office Action of Taiwan Counterpart Application," dated Jun. 5, 2017, p. 1-p. 3.

*Primary Examiner* — Jeffrey Sterrett
(74) *Attorney, Agent, or Firm* — JCIPRNET

(57) ABSTRACT

A multi-phase power controller is adapted for operating N power channels and is coupled to M drivers and an external system. The M drivers respectively have an enabling pin, and the multi-phase power controller includes a power state pin and M control pins. The power state pin is coupled to the enabling pin of each of the M drivers and the external system. The M control pins are coupled to the M drivers. In a power start period of the multi-phase power controller, the number of the power channels operated by the multi-phase power controller is less than N. After the power start period, the multi-phase power controller enables the M drivers through the power state pin and notifies the external system that a power start procedure has been completed through the power state pin.

11 Claims, 4 Drawing Sheets

(56) References Cited

U.S. PATENT DOCUMENTS

| | | | | |
|---|---|---|---|---|
| 2009/0267578 A1* | 10/2009 | Luo | ............... | H02J 1/102 323/272 |
| 2012/0262136 A1* | 10/2012 | Nien | ............... | H02M 3/1584 323/272 |
| 2015/0002112 A1* | 1/2015 | Tang | ............... | H02M 3/1584 323/271 |
| 2017/0019026 A1* | 1/2017 | Nien | ............... | H02M 3/1584 |
| 2017/0063239 A1* | 3/2017 | Wu | ............... | G06F 1/26 |

* cited by examiner

MULTI-PHASE POWER CONTROLLER, MULTI-PHASE POWER CONTROL DEVICE AND OPERATION METHOD OF MULTI-PHASE POWER CONTROLLER

CROSS-REFERENCE TO RELATED APPLICATION

This application claims the priority benefit of Taiwan application serial no. 105129899, filed on Sep. 14, 2016. The entirety of the above-mentioned patent application is hereby incorporated by reference herein and made a part of this specification.

BACKGROUND OF THE INVENTION

Field of the Invention

The invention relates to a power conversion technology and more particularly relates to a multi-phase power controller, a multi-phase power control device, and an operation method of the multi-phase power controller.

Description of Related Art

Generally, a multi-phase power conversion device is provided with a multi-phase power controller therein for controlling operations of multiple drivers and multiple power output stages in the device. To cope with the need of control over multiple drivers, the conventional multi-phase power controller usually requires additional drive enabling pins for enabling the multiple drivers, and the multi-phase power controller also needs a power state pin, so as to notify an external system whether the power supply state of the multi-phase power controller is normal. However, such a configuration would greatly increase the number of pins of the multi-phase power controller and raise the manufacturing cost of the multi-phase power controller.

SUMMARY OF THE INVENTION

The invention provides a multi-phase power controller, a multi-phase power control device, and an operation method of the multi-phase power controller for enabling a plurality of drivers by a power state pin, which is conducive to reducing the pin number of the multi-phase power controller and the manufacturing cost.

The invention provides a multi-phase power controller that is adapted for operating N power channels and coupled to M drivers and an external system. The M drivers respectively include an enabling pin. The multi-phase power controller includes a power state pin and M control pins. N is greater than M. M is an integer greater than or equal to 1. The power state pin is coupled to the enabling pin of each of the drivers and the external system. The M control pins are coupled to the M drivers. In a power start period of the multi-phase power controller, the number of the power channels operated by the multi-phase power controller is less than N. After the power start period, the multi-phase power controller enables the M drivers through the power state pin and notifies the external system that a power start procedure has been completed through the power state pin.

The invention provides a multi-phase power control device that includes N power channels and is coupled to an external system. The multi-phase power control device includes M drivers and a multi-phase power controller. N is greater than M, and M is an integer greater than or equal to 1. The multi-phase power controller includes a power state pin. The power state pin is coupled to the enabling pin of each of the drivers and the external system. In a power start period of the multi-phase power controller, the number of the power channels operated by the multi-phase power controller is less than N. After the power start period, the multi-phase power controller enables the M drivers through the power state pin and notifies the external system that a power start procedure has been completed through the power state pin.

The invention provides an operation method of a multi-phase power controller, which is adapted for operating N power channels and includes a power state pin coupled to an external system and M enabling pins of M drivers. The operation method includes the following steps. In a power start period, the number of the power channels operated by the multi-phase power controller is less than N. N is greater than M, and M is an integer greater than or equal to 1. After the power start period, the M drivers are enabled through the power state pin and the external system is notified of that a power start procedure has been completed through the power state pin.

Based on the above, in the power start period, the number of the power channels operated by the multi-phase power controller of the invention is less than the maximum number N of the power channels that can be operated, and after the power start period, the multi-phase power controller enables a plurality of drivers through the power state pin. Accordingly, the pin number and manufacturing cost of the multi-phase power controller are reduced.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
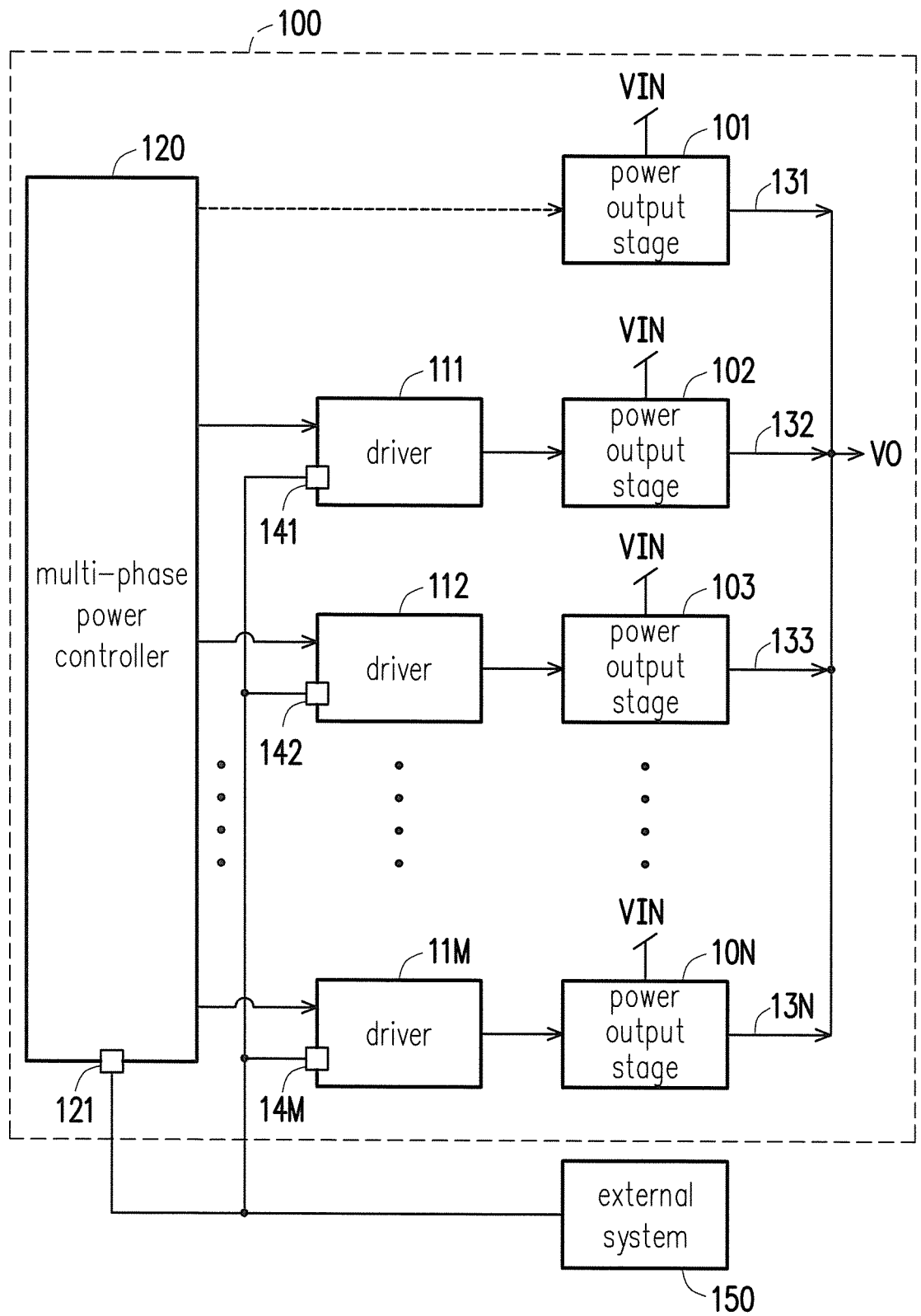
FIG. 1 is a block diagram illustrating the multi-phase power control device according to an embodiment of the invention.

FIG. 1 is a block diagram illustrating a multi-phase power control device according to an embodiment of the invention. As shown in FIG. 1, a multi-phase power control device 100 includes M drivers 111 to 11M, N power output stages 101 to 10N, and a multi-phase power controller 120, wherein M is an integer greater than or equal to 1, N is an integer, and N is greater than M. Further, the multi-phase power control device 100 includes N power channels 131 to 13N corresponding to the N power output stages 101 to 10N. Specifically, the multi-phase power control device 100 is, for example, a multi-phase power conversion device having N phases for converting an input voltage VIN into an output voltage VO. In other words, the multi-phase power controller 120 is adapted for operating the N power channels 131 to 13N. That is, the maximum number of workable phases of the multi-phase power controller 120 is N.

The multi-phase power controller 120 includes a power state pin 121, and the drivers 111 to 11M respectively have an enabling pin. For example, the M drivers 111 to 11M include M enabling pins 141 to 14M. The power state pin 121 is coupled to the M enabling pins 141 to 14M and an external system 150. In a power start period of the multi-phase power controller 120, the number of the power channels operated by the multi-phase power controller 120 is less than N. For example, in the power start period, the number of the power channels operated by the multi-phase power controller 120 is equal to or less than (N–M).

In the power start period, the multi-phase power controller 120 controls the power output stage 101 coupled to the power channel 131. At the moment, the power state pin 121 has not enabled the M drivers 111 to 11M yet. At the moment, the multi-phase power control device 100 gradually raises the output voltage VO through the power output stage 101. The output voltage VO may be fed back to the multi-phase power controller 120. The multi-phase power controller 120 determines whether the output voltage VO is increased to a target level. When the output voltage VO is increased to the target level, the multi-phase power controller 120 ends the power start period. In other words, in the power start period, the number of phases enabled by the multi-phase power control device 100 is less than the maximum number of workable phases.

After the power start period, the multi-phase power controller 120 enables the M drivers 111 to 11M through the power state pin 121 and notifies the external system 150 that a power start procedure has been completed through the power state pin 121. In other words, the multi-phase power controller 120 controls the M drivers 111 to 11M through the power state pin 121. In comparison with the conventional technology, the multi-phase power controller 120 does not need to be equipped with enabling pins that are disposed especially for the M drivers 111 to 11M. Thus, the pin number and manufacturing cost of the multi-phase power controller 120 are reduced. Moreover, in the power start period, the multi-phase power controller 120 further executes a function setting operation through unused power channels, by which the pin number and the manufacturing cost of the multi-phase power controller 120 are further reduced.

Figure 2:
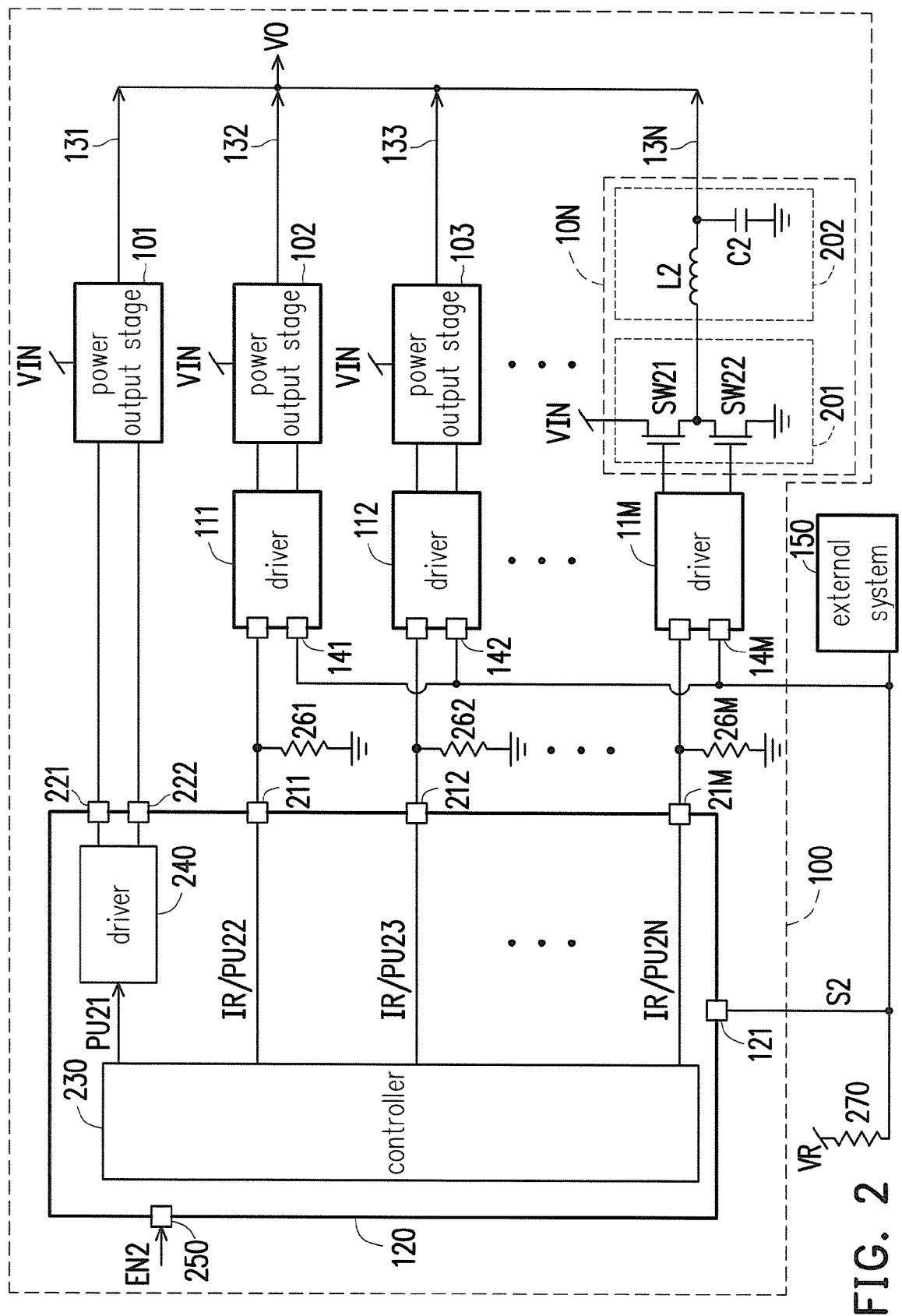
FIG. 2 is a block diagram illustrating the multi-phase power control device according to another embodiment of the invention.
Figure 3:
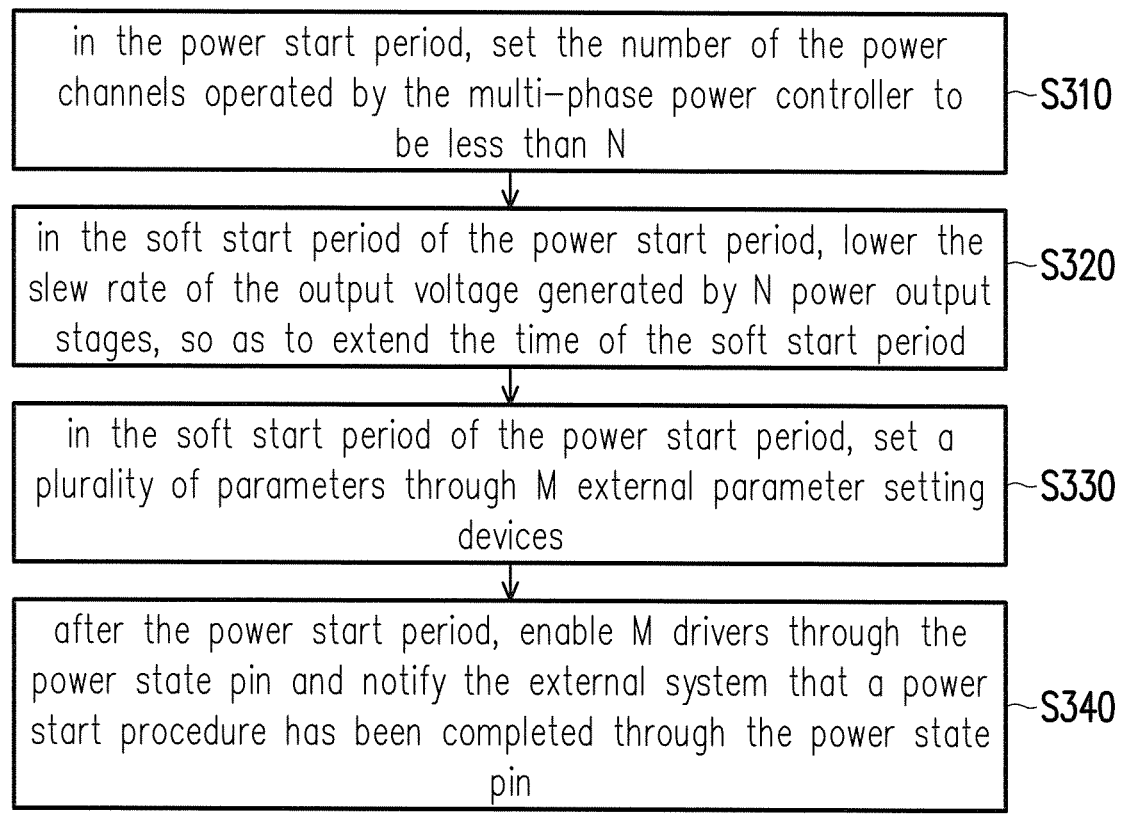
FIG. 3 is a flowchart illustrating the operation method of the multi-phase power controller according to an embodiment of the invention.
Figure 4:
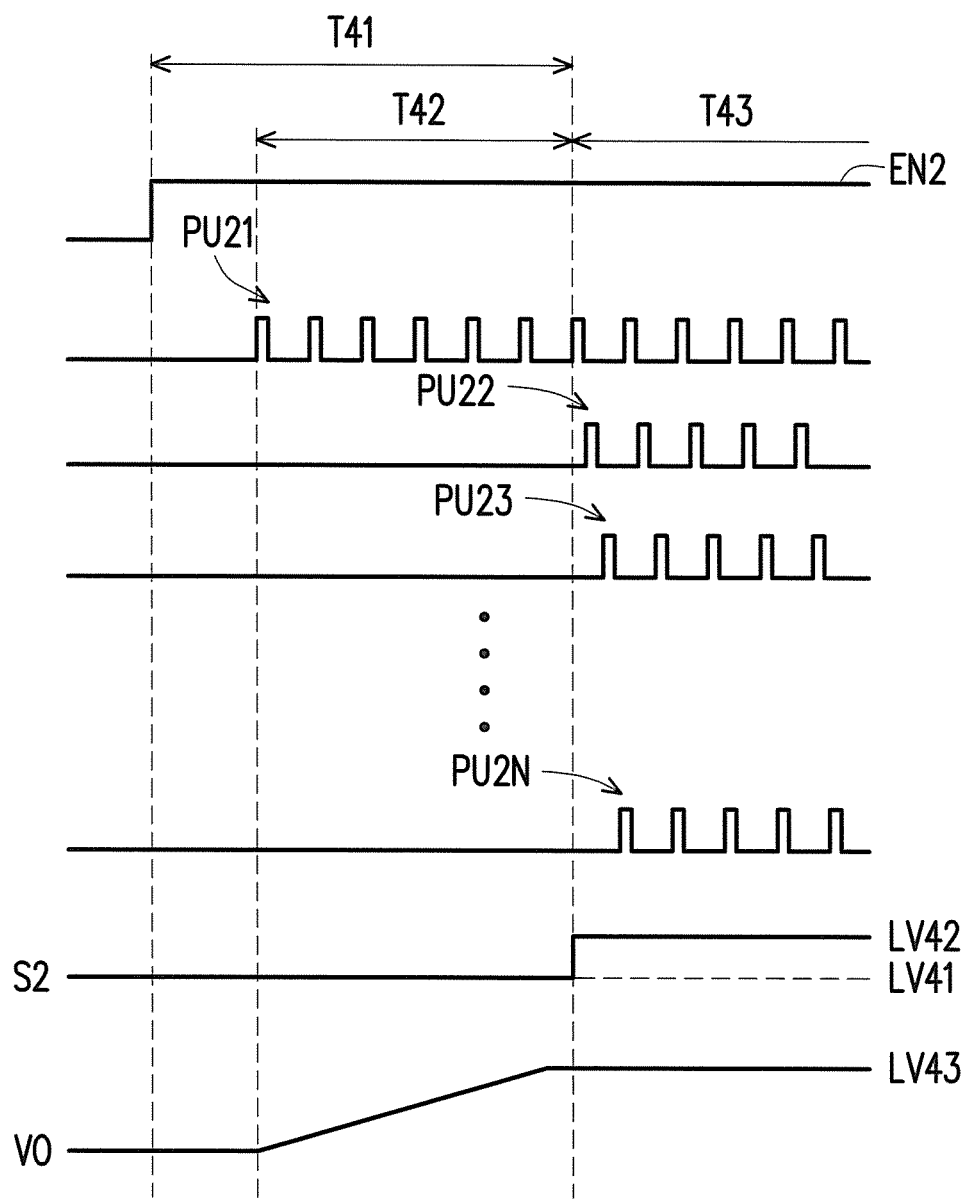
FIG. 4 is a timing diagram of the multi-phase power control device according to an embodiment of the invention.

To more clearly explain the invention to those skilled in the art, FIG. 2 is a block diagram illustrating the multi-phase power control device according to another embodiment of the invention; FIG. 3 is a flowchart illustrating an operation method of the multi-phase power controller according to an embodiment of the invention; and FIG. 4 is a timing diagram of the multi-phase power control device according to an embodiment of the invention. Details of the operation of the multi-phase power control device are described hereinafter with reference to FIG. 2 to FIG. 4.

As shown in FIG. 2, the multi-phase power controller 120 includes M control pins 211 to 21M coupled to the M drivers 111 to 11M and control pins 221 and 222 directly coupled to the power output stage 101 for operating the N power channels 131 to 13N. The multi-phase power controller 120 further includes a controller 230, a driver 240, and an enabling pin 250. The driver 240 is coupled between the controller 230 and the control pins 221 to 222, and the controller 230 is coupled to the power state pin 121 and the M control pins 211 to 21M.

The M control pins 211 to 21M are coupled to M external parameter setting devices 261 to 26M, wherein each of the external parameter setting devices 261 to 26M may be a resistor. The N power output stages 101 to 10N are coupled to the N power channels 131 to 13N, and the N power output stages 101 to 10N have similar or identical circuit structures. Take the power output stage 10N as an example, the power output stage 10N is coupled to the power channel 13N and includes an output stage circuit 201 and an impedance circuit 202. The output stage circuit 201 includes an upper bridge switch SW21 and a lower bridge switch SW22 connected in series between the input voltage VIN and a ground terminal. The impedance circuit 202 includes an inductor L2 and a capacitor C2.

In terms of operation, the multi-phase power controller 120 starts to operate in response to an enabling signal EN2 from the enabling pin 250. As shown in FIG. 4, the multi-phase power controller 120 enters a power start period T41 as the multi-phase power controller 120 starts to operate. The power start period T41 includes a soft start period T42. The controller 230 performs an initializing procedure in an initial stage of the power start period T41 and then performs a soft start operation in the soft start period T42, so as to boost the output voltage VO.

Referring to FIG. 3 and FIG. 4, as shown in Step S310, in the power start period T41, the number of the power channels operated by the multi-phase power controller 120 is less than N. The first terminal of an external resistor 270 receives a reference voltage VR, and the second terminal of the external resistor 270 is coupled to an internal switch (not shown) of the multi-phase power controller 120 through the power state pin 121. In the power start period T41, the controller 230 turns on the internal switch, so as to pull the second terminal of the external resistor 270 down to the ground terminal. Thereby, a power state signal S2 is maintained at a first level LV41 (i.e., ground voltage), such that the M drivers 111 to 11M remain in a disabled state.

As shown in Step S320, in the soft start period T42 of the power start period T41, the controller 230 lowers a slew rate (i.e., voltage-time curve slope) of the output voltage VO generated by the power output stages 101 to 10N, so as to extend the time of the soft start period T42 and reduce a surge current of the workable phase. Thus, in the soft start period T42, the multi-phase power control device 100 is able to perform soft start with fewer power channels. That is, in the soft start period T42, the multi-phase power control device 100 gradually raises the output voltage VO to the target level LV43 by using only part of the phases (e.g., the power output stage 101).

As shown in Step S330, in the soft start period T42 of the power start period T41, i.e., in a soft start mode, the controller 230 sets a plurality of parameters through the M external parameter setting devices 261 to 26M. In the soft start period T42, the multi-phase power controller 120 transmits a setting current IR to the M external parameter setting devices 261 to 26M respectively. The external parameter setting device 261 generates a setting voltage in response to the setting current, such that the controller 230 sets a parameter in response to the setting voltage. The external parameter setting device 262 generates another setting voltage in response to the setting current, such that the controller 230 sets another parameter in response to the another setting voltage. The operation of the rest of the parameter setting devices may be inferred from the above.

When the output voltage VO of the multi-phase power control device 100 is increased to the target level LV43, the multi-phase power controller 120 ends the power start period T42 and enters a normal operation period T43, i.e., a normal operation mode. As shown in Step S340, after the power start period T42, i.e., in the normal operation period T43, the multi-phase power controller 120 enables the M drivers 111 to 11M through the power state pin 121 and notifies the external system 150 that a power start procedure has been completed through the power state pin 121. That is, the multi-phase power controller 120 notifies the external system 150 that the output voltage VO has risen to the target level LV43.

When the power start procedure has been completed, i.e., when the output voltage VO is increased to the target level LV43, the controller 230 turns off the internal switch coupled to the power state pin 121, so as to pull the power state signal S2 up to the second level LV42 (i.e., the reference voltage VR). Thereby, the M drivers 111 to 11M are switched to an enabled state in response to the power state signal S2 with the second level LV42, i.e., a power good signal. In the normal operation period T43, in addition to continuously generating a pulse width modulation signal PU21, the controller 230 further generates pulse width modulation signals PU22 to PU2N. The multi-phase power controller 120 transmits the pulse width modulation signals PU22 to PU2N to the M drivers 111 to 11M through the M control pins 211 to 21M.

In the normal operation period T43, the M drivers 111 to 11M drive the power output stages 102 to 10N in response to the pulse width modulation signals PU22 to PU2N. Take the power output stage 10N as an example, the driver 11M generates a plurality of driving signals in response to the pulse width modulation signal PU2N. The output stage circuit 201 switches conductive states of the upper bridge switch SW21 and the lower bridge switch SW22 according to the driving signals. A current flowing through the inductor L2 changes according to the change of the conductive states of the upper bridge switch SW21 and the lower bridge switch SW22, and the capacitor C2 also charges or discharges correspondingly. The input voltage VIN is converted into the output voltage VO through the output stage circuit 201 and the impedance circuit 202. In the normal operation period T43, the multi-phase power control device 100 maintains the output voltage VO at the target level LV43 by all the phases (e.g., the power output stages 101 to 10N).

In another embodiment, the driver 240 is disposed outside the multi-phase power controller 120. In that case, the multi-phase power controller 120 controls the driver 240 disposed outside through the control pins 221 and 222. For example, the multi-phase power controller 120 transmits the pulse width modulation signal PU21 to the driver 240 disposed outside through the control pin 221 and transmits the enabling signal for controlling the driver 240 through the control pin 222.

In a word, the multi-phase power controller 120 controls the output voltage VO generated by the N power output stages 101 to 10N through the M drivers 111 to 11M. When the output voltage VO is increased to the target level LV43, i.e., when the power start procedure has been completed, the multi-phase power controller 120 is switched from the soft start period T42 to the normal operation period T43 and notifies the external system 150 of the switch through the power state pin 121. In the soft start period T42, the multi-phase power controller 120 disables the M drivers 111 to 11M through the power state pin 121, so as to raise the output voltage VO to the target level LV43 by part of the phases or the power output stages. In the normal operation period T43, the multi-phase power controller 120 enables the M drivers 111 to 11M through the power state pin 121, so as to maintain the output voltage VO at the target level LV43 by all of the phases or the power output stages.

To sum up, the multi-phase power controller of the invention controls the M drivers through the power state pin. In comparison with the conventional technology, the multi-phase power controller of the invention does not need to be equipped with enabling pins that are disposed especially for the M drivers. Thus, the pin number and manufacturing cost of the multi-phase power controller are reduced. Moreover, in the power start period, the multi-phase power controller may further execute a function setting operation through the unused power channels, by which the pin number and the manufacturing cost of the multi-phase power controller are further reduced.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A multi-phase power controller adapted for operating N power channels and coupled to M drivers and an external system, wherein the M drivers respectively comprise an enabling pin, the multi-phase power controller comprising:
   a power state pin coupled to the enabling pin of each of the M drivers and the external system; and
   M control pins coupled to the M drivers, wherein N is greater than M, and M is an integer greater than or equal to 1;
   wherein in a power start period of the multi-phase power controller, the number of the power channels operated by the multi-phase power controller is less than N, and after the power start period, the multi-phase power controller enables the M drivers through the power state pin and notifies the external system that a power start procedure has been completed through the power state pin.

2. The multi-phase power controller according to claim 1, wherein in the power start period of the multi-phase power controller, the number of the power channels operated by the multi-phase power controller is (N−M).

3. The multi-phase power controller according to claim 1, wherein the M control pins are further coupled to M external parameter setting devices, and in a soft start period of the power start period, the multi-phase power controller sets a plurality of parameters through the M external parameter setting devices.

4. The multi-phase power controller according to claim 1, wherein after the multi-phase power controller enables the M drivers, the multi-phase power controller provides a plurality of pulse width modulation signals to the M drivers through the M control pins.

5. A multi-phase power control device comprising N power channels and coupled to an external system, the multi-phase power control device comprising:
   M drivers respectively comprising an enabling pin, wherein N is greater than M, and M is an integer greater than or equal to 1; and
   a multi-phase power controller, comprising:
     a power state pin coupled to the enabling pin of each of the drivers and the external system;
     wherein in a power start period of the multi-phase power controller, the number of the power channels operated by the multi-phase power controller is less than N, and after the power start period, the multi-phase power controller enables the M drivers through the power state pin and notifies the external system that a power start procedure has been completed through the power state pin.

6. The multi-phase power control device according to claim 5, wherein in the power start period of the multi-phase power controller, the number of the power channels operated by the multi-phase power controller is (N−M).

7. The multi-phase power control device according to claim 5, wherein the multi-phase power controller further comprises M control pins that are coupled to M external parameter setting devices and the M drivers, and in a soft start period of the power start period, the multi-phase power controller sets a plurality of parameters through the M external parameter setting devices.

8. The multi-phase power control device according to claim 5, wherein the multi-phase power controller further comprises a plurality of control pins, and after the multi-phase power controller enables the M drivers, the multi-phase power controller provides a plurality of pulse width modulation signals to the M drivers through the control pins.

9. An operation method of a multi-phase power controller, which is adapted for operating N power channels and comprises a power state pin coupled to an external system and M enabling pins of M drivers, the operation method comprising:
    setting the number of the power channels operated by the multi-phase power controller to be less than N in a power start period, wherein N is greater than M, and M is an integer greater than or equal to 1; and
    enabling the M drivers through the power state pin and notifying the external system that a power start procedure has been completed through the power state pin after the power start period.

10. The operation method according to claim 9, wherein the multi-phase power controller comprises M control pins that are coupled to M external parameter setting devices, and the operation method further comprises:
    setting a plurality of parameters through the M external parameter setting devices in a soft start period of the power start period.

11. The operation method according to claim 9, further comprising:
    lowering a slew rate of an output voltage generated by the N power channels in a soft start period of the power start period to extend a time of the soft start period.

* * * * *